United States Patent [19]
Malkin et al.

[11] Patent Number: 5,587,131
[45] Date of Patent: Dec. 24, 1996

[54] SYSTEM FOR AN EFFICIENT MANUFACTURE OF OZONE

[75] Inventors: Boris Malkin; Gena Perlov; Shmuel Yannai, all of Haifa, Israel

[73] Assignee: Ozontech Ltd., Israel

[21] Appl. No.: 405,848

[22] Filed: Mar. 17, 1995

Related U.S. Application Data

[63] Continuation-in-part of Ser. No. 209,563, Mar. 10, 1994, abandoned.

[30] Foreign Application Priority Data

Mar. 25, 1993 [IL] Israel ........................................ 105166

[51] Int. Cl.$^6$ .................................................. B01J 19/12
[52] U.S. Cl. .................................. 422/186.11; 422/186.07
[58] Field of Search ........................... 422/186.07, 186.11

[56] References Cited

U.S. PATENT DOCUMENTS

| | | | |
|---|---|---|---|
| 4,156,652 | 5/1979 | Wiest | 230/527 |
| 4,910,637 | 3/1990 | Hanna | 361/229 |
| 5,073,796 | 12/1991 | Suzuki et al. | 355/215 |
| 5,255,520 | 10/1993 | O'Geary et al. | 62/3.2 |

FOREIGN PATENT DOCUMENTS

| | | |
|---|---|---|
| 3424889 | 2/1986 | Germany . |
| 1567514 | 8/1988 | Russian Federation . |
| 1414771 | 8/1988 | Russian Federation . |

OTHER PUBLICATIONS

Pimitriov, M. A., "Design Guidance Manual For Ozone Systems", Pan American Committe of the Int'l Ozone Assn., 1990, pp. 3–19, 28–40, 56–75.

*Primary Examiner*—Charles T. Jordan
*Assistant Examiner*—Daniel Jenkins
*Attorney, Agent, or Firm*—Morgan & Finnegan

[57] ABSTRACT

A system for producing ozone at a high efficiency from oxygen or air is described. According to a preferred embodiment of the invention, the system comprises at least two parallel electrodes made of metallic surfaces and separated by dielectric insulating material, wherein air or oxygen is passed through the gap between the electrodes with an electric field of at least 4 kV/mm AC, being characterized by: (a) a ratio of the electrodes-surface area to gas volume of at least 2 cm$^2$.min/l, said electrode being selected from a horizontal, vertical and plate type tube, and (b) the electric field in the said gap is formed by the difference in potentials between the electrodes and the dielectric insulating material. According to a preferred embodiment the dielectric insulating material has a breakdown voltage of at least 12 kV/mm. Among the main advantages of the system is the small size of the generator and the relatively small amount of energy required per unit of ozone produced.

14 Claims, 12 Drawing Sheets

SYSTEM FOR AN EFFICIENT MANUFACTURE OF OZONE

This application is a continuation in part of U.S. patent application Ser. No. 08/209,563, filed Mar. 10, 1994, now abandoned.

The present invention relates to the manufacture of ozone and uses thereof. More particularly, the invention relates to a new compact system for the manufacture of ozone and new uses thereof.

BACKGROUND OF THE INVENTION

Ozone is a well-known chemical agent used in industrial oxidation, water and air treatment and many chemical syntheses. As is known, ozone is an unstable gas which is produced by the dissociation-association of oxygen in an electric field derived from a high voltage, on gaseous oxygen or air, obtaining a dilute mixture of ozone and the original gas. Due to its instability, ozone must be produced at-site near its application for a particular purpose. As a consequence, it is most desirable to provide a compact generator for ozone production. The general approach for its manufacture is based on passing a current of air or oxygen between two electrodes subjected to an alternating current with a high potential difference. The voltage applied to the electrodes depends on the type and thickness of the dielectric and width of the gap between electrodes, which is usually in the range of 4,000 to 20,000 volts, depending on the gap.

Due to its importance, the literature is quite abundant with various suggestions and patents claiming some improvements for producing ozone. Most of these patents are claiming various types of electrodes for producing the required electric field. Thus, according to the German Patent Number 3,424,889, a special electrode is described being made from a metal layer covered by a ceramic layer coated with an additional thin glassy layer with a smooth surface.

According to the Russian Patent Number 1,567,514, the ozonizer described comprises two electrodes, constructed in the form of 2 coaxially arranged metal tubes coated with glass or enamel. The annular space between the intermediate and outer tube and the inner tube are filled with water.

In the Russian Patent Number 1,414,771, an apparatus for producing ozone is claimed. The apparatus comprises a housing, an ozone generator with flow sensors and summator, a multiphase current source, an anode and cathode current assemblies and an impulse-phase control unit. The summator outlet is connected to the inlet of the impulse-phase control unit.

One of the problems encountered in the production of ozone is related to the losses involved in the electrical discharge, where a large proportion of energy is converted into heat, which gives rise to a high increase in temperature. As a result, an efficient cooling system is required, due to the fact that the yield of ozone produced is reduced when the gas temperature is increased. The main disadvantages of the known ozone generators are their bulky construction, and the relatively large amount of energy required per quantity unit of ozone produced. It is an object of the present invention to provide a system for producing ozone, which requires relatively low energy per quantity unit of ozone produced. It is yet another object of the present invention to provide a compact system for ozone production, which facilitates its portabilty and uses for various purposes.

BRIEF DESCRIPTION OF THE INVENTION

The invention relates to a system for producing ozone at a high efficiency from a gaseous stream consisting of oxygen or air, using a generator which comprises at least two electrodes, having metallic surfaces and separated by a dielectric insulating material, wherein said gaseous stream is passed through the gap between the electrodes with an electric field of at least 4 kV/mm AC, being characterized by the following:

(a) ratio of the electrode-surface area to gas volume is at least 2 $cm^2$.min/liter, said electrode being selected from a horizontal, vertical and plate type tube, and (b) the electric field in the said gap is formed by the difference in potentials between said electrodes. In a most preferred embodiment, the dielectric insulating material should have a breakdown voltage of at least 12 kV/mm and the frequency of the electric field should be at least 50 Hz. An advantage of the system is the fact that the circulating air at ambient temperature used as a cooling medium is enclosed in a chamber, passing through said two electrodes, possessing a particular configuration, including compartments which provide mechanical support and electric insulation. Another significant advantage of the system according to the present invention is the small size of the generator and the relatively small amount of energy required per unit of ozone produced.

BRIEF DESCRIPTION OF THE DRAWINGS

FIG. 1, is a schematic illustration of the ozone generator according to the present invention, including exploded FIG. 1A of the electrodes.

FIG. 1a, is an enlarged section of an electrode 4, shown in FIG. 1.

DETAILED DESCRIPTION OF THE INVENTION

A particular requirement for ozone production, in order to obtain a high efficiency using a system according to the present invention, is the use of a very dry air or oxygen. It was found that a moisture content of above 5 ppm will significantly decrease the ozone output. This dehumidification of the air or oxygen is achieved by using a desiccating material. In principle, any desiccant may be used, but preferred desiccants found to be most useful for the present invention, are calcium chloride, magnesium perchlorate, phosphorus pentoxide and silica gel.

The electrodes to be used may be selected from a light material, such as glass, sintered borosilicate or Pyrex glass, sintered alumina, ceramic or a plastic layer possessing a high dielectric constant. This has an advantage concerning the production of a small and portable system for the ozone manufacture to be used at-site. This arrangement of the system enables to obtain an electrode-surface area to mass ratio much higher than in the conventional ozone generators. In this manner, this will assist the feature required in the system according to the present invention that minimum air spaces will exist between the electrodes, while maintaining a relatively low plasma discharge voltage. By this arrangement, it is possible to obtain a high ozone capacity generator of a relatively small size, which is easily portable. In contrast to the known generators, which are bulky, heavy and consume large amounts of energy, the ozone system according to the present invention is characterized by its small size and the relatively smaller amount of energy required for producing ozone. Thus, instead of 18 to 20 kWh per kg ozone required by the commercially available ozone generators, using the system according to the present invention only about 14 kWh per kg ozone are consumed.

A significant advantage of the generator according to the present invention is the use of air or oxygen as a cooling medium, instead of water cooling used by the known generators for the same ozone production capacity. This advantageous feature is a consequence of the high electrode-surface area to mass-ratio used in the generator according to the present invention. Consequently, in the plate-type model a simple circulation of air or oxygen at ambient temperature will be enough to cool the electrodes.

In models consisting of concentric cylinders and other non-planar models, the system consists of an assembly of cells including tubes, ducts and rods having a circular, triangular, square or polygonal cross section, in which some of the tubes convey a cooling liquid, such as water or oil. The inner surfaces of the tubes serve as electrodes, and are made from a thin layer of metal. It is also possible that the cooling liquid itself may serve as an electrode by flowing through two electrodes, being separated and electrically insulated.

The ozone generator according to the present invention may be of various configurations, more frequently being horizontal or vertical tube-type and plate-type. In case of a pair of parallel plates, at least one is in a parallel linear motion. The whole system is generally enclosed in a chamber and incorporates cooling means provided by circulation of air or oxygen from which ozone is produced. In case of horizontal or vertical tube-type, there are two concentric electrodes and a dielectric tube.

Generally, the ozone generator used in the present invention is fed by an alternating current from a power source which uses a frequency up to 20 kHz and preferably between 50 Herz to 10 kHz. In this case, an efficiency of above 18% is attained by electromagnetic resonance of the ozone generator as capacitor and a serial and parallel resistors and the power supply components. This is a significant improvement over the existing ozone generators which produce the ozone at an efficiency of up to 12%, based on the oxygen concentration in ambient air.

Figure 10:
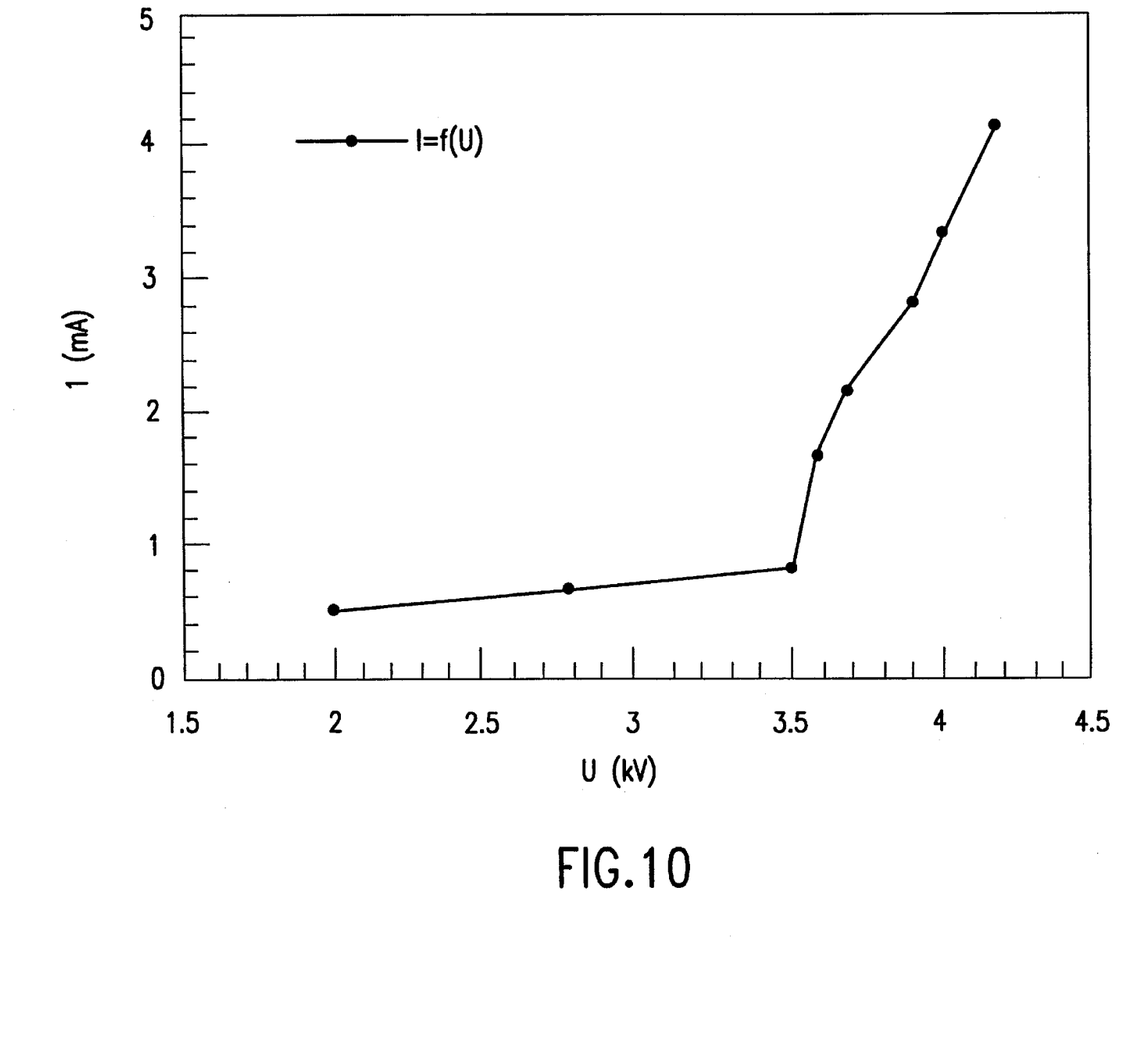
FIG. 10, illustrates a graph which correlates the applied current intensity expressed in mA, to the respective voltage expressed in kV.
Figure 11:
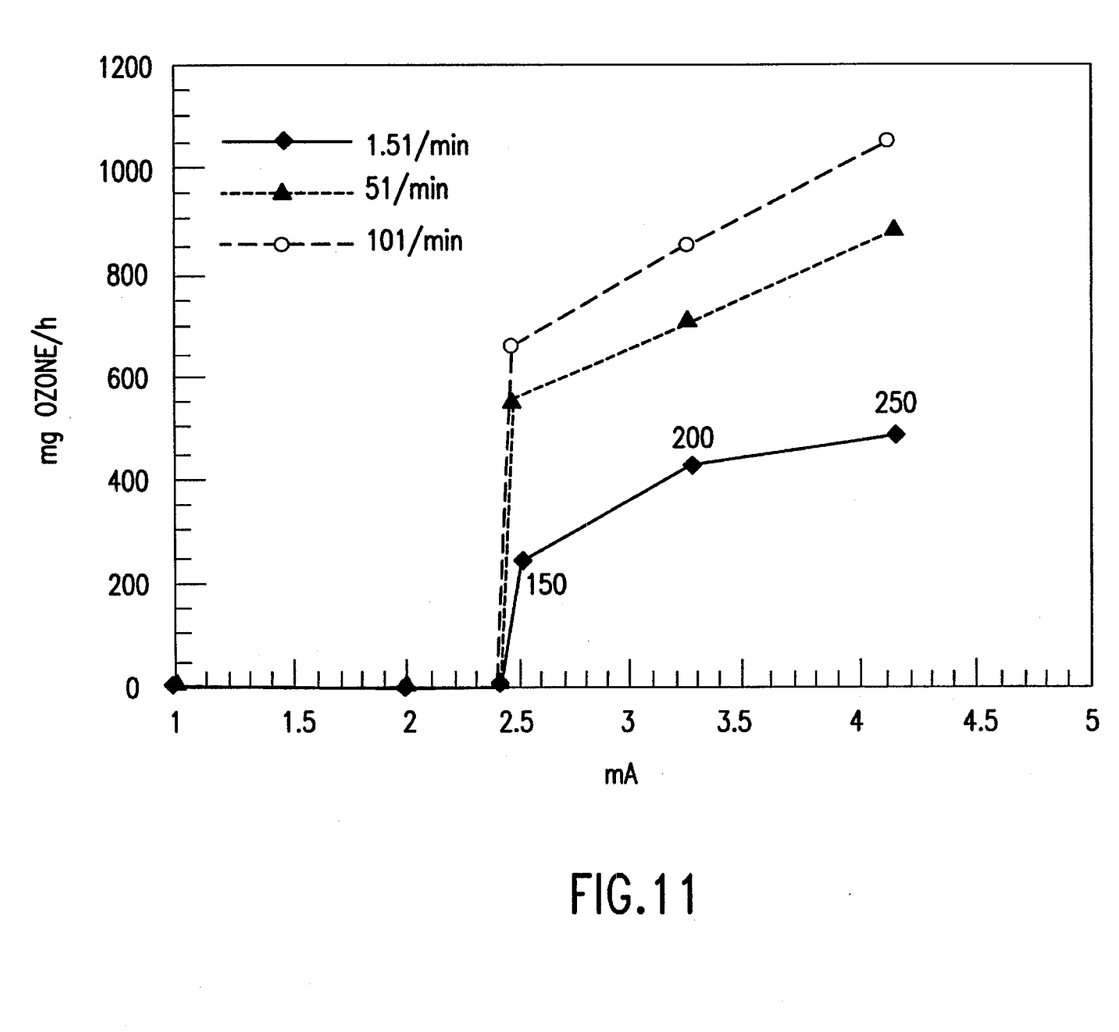
FIG. 11, illustrates the amount of ozone produced (mg/h) as a function of the current intensity applied (mA).

As can be seen in FIGS. 10 and 11, at a voltage of 4 kV, an amount of 820 mg per hour of ozone can be produced with a flow-rate of 2 $cm^2.min/l$. This is equivalent to a flow rate of 10 l/min, and a total surface of the electrode of 20 $cm^2$.

Due to the above-mentioned advantageous features, the ozone obtained according to the present invention may be used for various purposes at-site. In case of a model intended for water treatment, the ozone formed in the generator is dispersed by passing through a sleeve or filter, thus obtaining small bubbles with a maximum surface area, which are collected into a container where it is to be used. It was found that the highest efficiency of ozone use is achieved when said sleeve is made of sintered glass which provides a very small volume of ozone bubbles which are not more than $5 \times 10^{-7}$ ml, compared with the usual size of $1 \times 10^{-2}$ ml. In this manner, the total bubble surface area is significantly increased, thus facilitating an efficient and a fast treatment with the ozone produced, according to the present invention, which cannot be obtained with the known ozone generators.

According to another embodiment, the ozone released from the generator is mixed in a separate compartment provided with a temperature control device, thus facilitating the supply of any desired amount of ozone.

Figure 9:
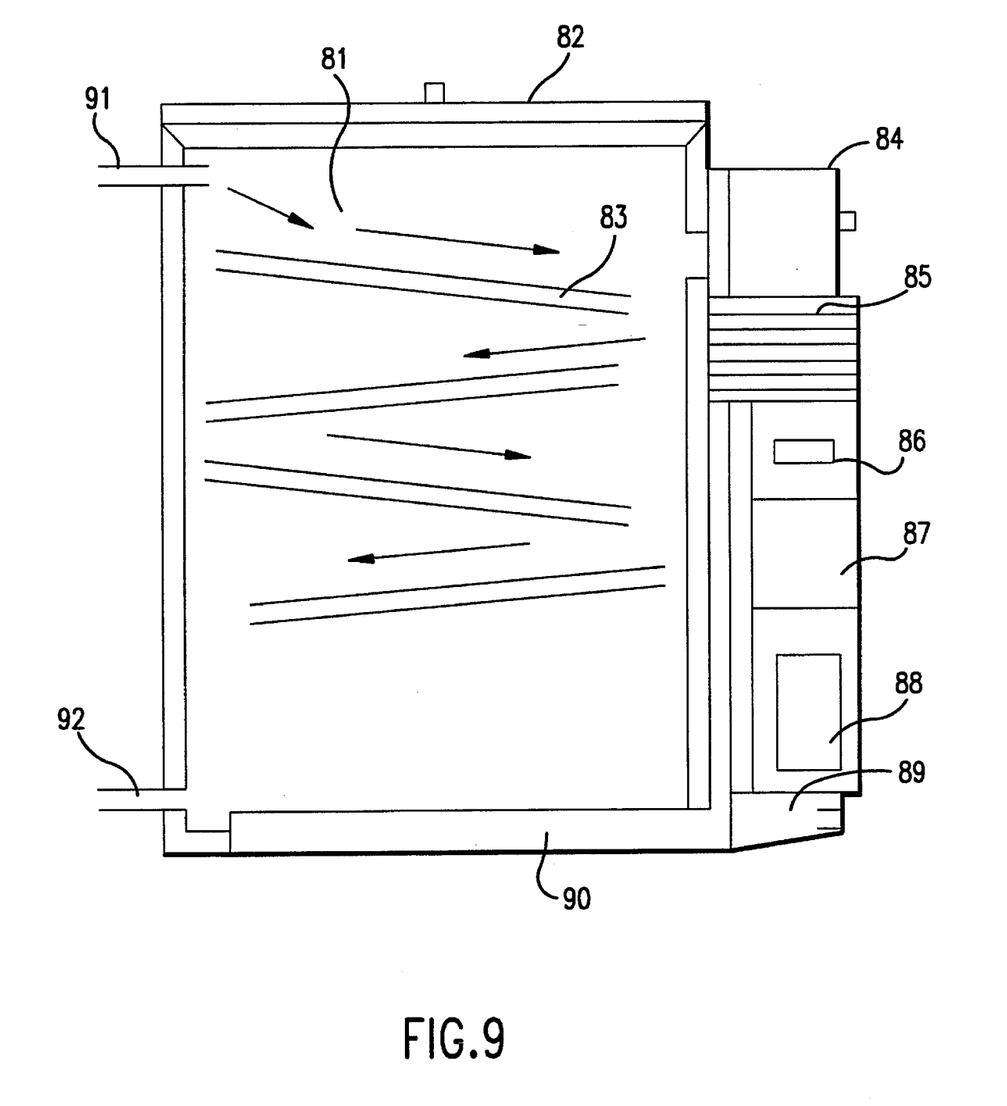
FIG. 9, represents a schematic illustration of a system using the present invention for water purification.

The oxidizing properties of ozone are indeed well-known; however, due to its relatively high costs of manufacture as well as problems involved in its production at-site, the uses of ozone have been quite limited. According to the present invention, where the ozone manufacture costs are significantly reduced and small, light and inexpensive systems are provided, many uses are envisaged. Thus, for instance, ozone can be used for sterilization and deodorization of water, for eliminating objectionable tastes and odours, for eliminating harmful compounds from industrial wastes and controlling bacteria in cold-storage rooms. FIG. 9, is a schematic illustration of the system used for water purification.

According to another mode of use, the container in which the ozone is dispersed can be fitted with shelves on which solid materials to be treated by ozone, such as agricultural products, food products, packaging materials or equipment that have to be sterilized, can be loaded. At the outlet of the container, the residual ozone is spontaneously converted back into oxygen. In cases where even traces of ozone are undesirable, it is possible to provide at said outlet a trap containing a solution of a reducing agent or active carbon, which will readily eliminate said residue.

DETAILED DESCRIPTION OF THE FIGURES

Figures 1, 1A:
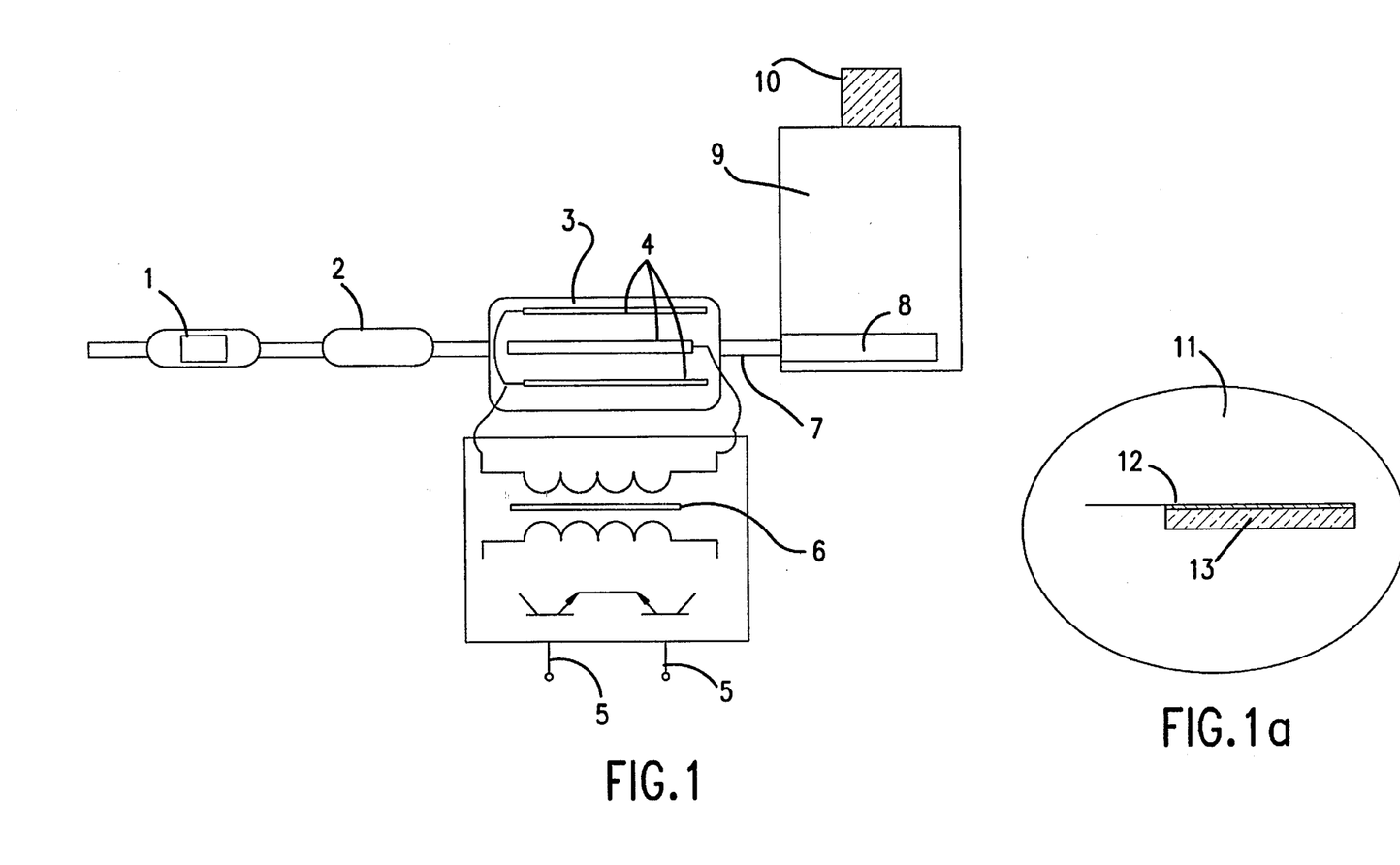

FIGS. 1 and 1A are a schematic illustration of the ozone generator according to the present invention. As can be noticed, the generator comprises the following constituents:

1: the compressor which provides air or oxygen;

2: the filter with a desiccant producing dried air or oxygen;

3: the ozone generator;

4: electrodes in the generator (also enlarged under 11)

5: the voltage entrance of the inverter (6);

7: exit of the air and ozone mixture which enters into the sleeve (8) located in the reservoir (9);

10: the filter for ozone residues at the exit from the reservoir, generally being sintered glass (scaled down in the Figure);

11: the electrode;

12: metal coating;

13: glass, ceramic material or plastic, possessing a high dielectric constant.

Figure 2:
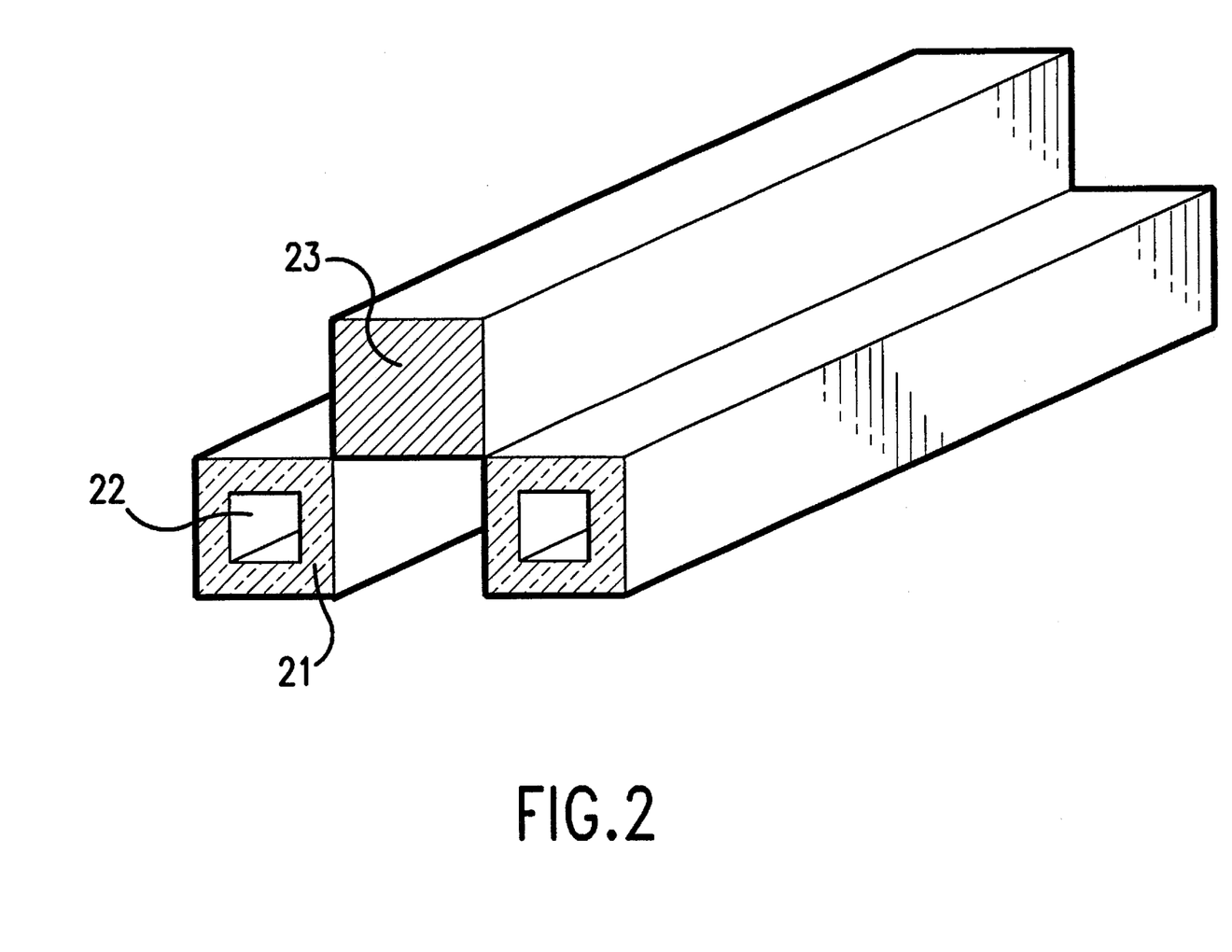
FIG. 2, illustrates a whole unit cell.

FIG. 2, depicts a unit cell consisting of an insulating material such as extruded glass or ceramic. The internal surfaces of the tubes (21) are coated with metal (22) and all the tubes comprising the cell are attached to a central supporting rod (23) which provides mechanical strength.

Figure 3:
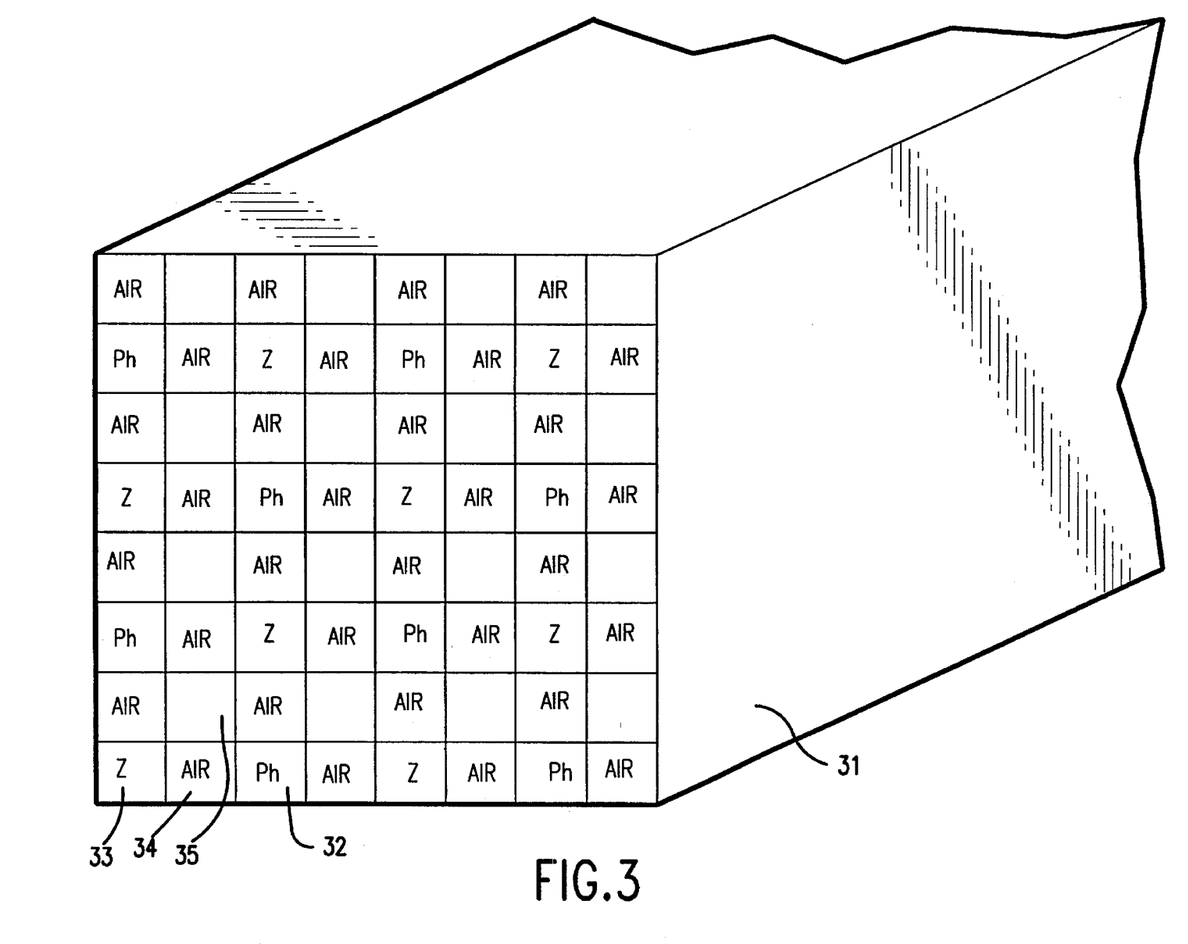
FIG. 3, illustrates a cross section of an ozone generator assembly consisting of unit cells.

FIG. 3, shows a cross-section of an ozone generator assembly (31), comprising unit cells (as illustrated in FIG. 3). The binding of some cells of this design together facilitates the construction of a compact setup packed tightly within a pipe, consisting of phase (32) and zero (33) electrodes, air tubes (34) and reinforcement rods (35). The advantage of this cylindrical ozone generator is that it possesses a relatively large electrode surface area with an advantageous heat exchange and efficient cooling of all cells, a problem which is well-known in the operation of existing large ozone generators.

Figure 4:
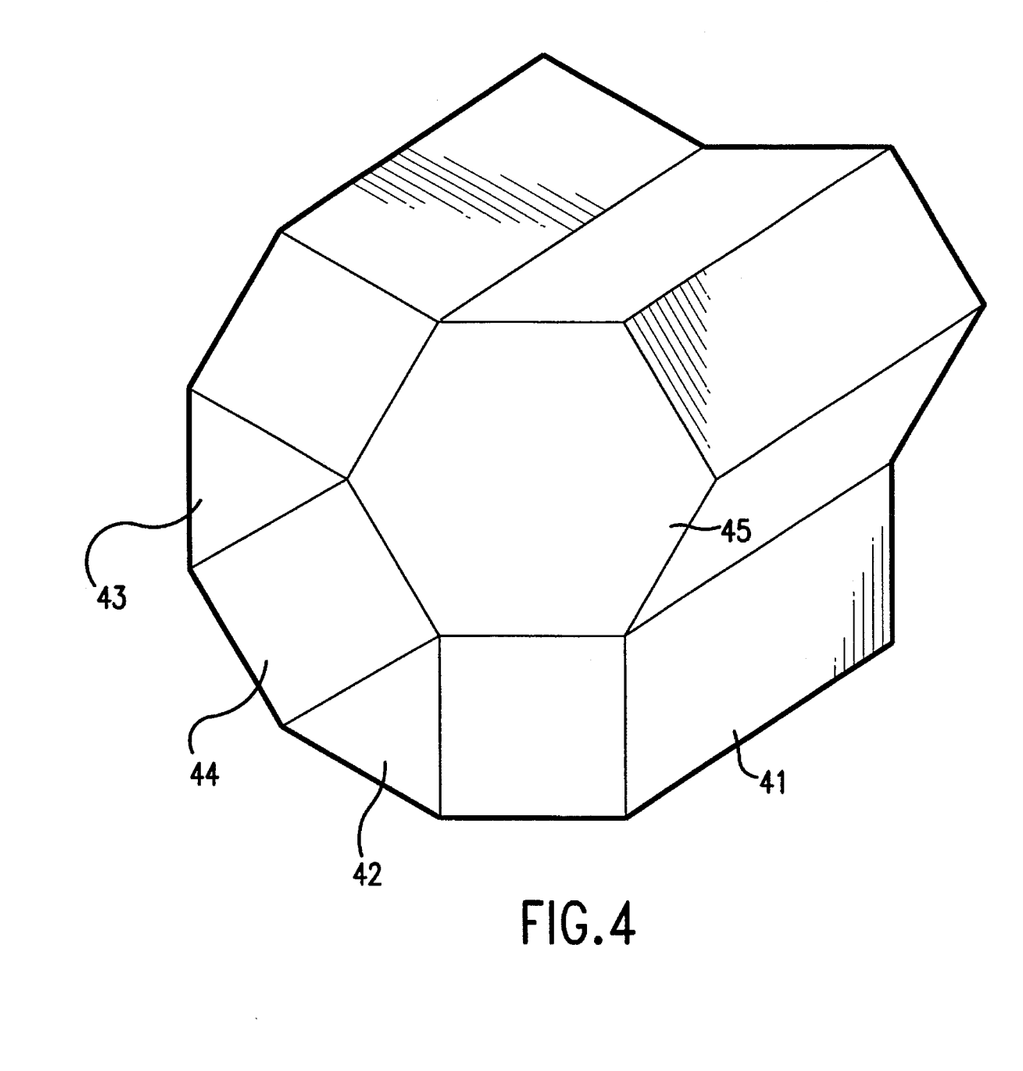
FIG. 4, illustrates a partial assembly of more than one unit.

FIG. 4, illustrates a whole unit cell of a cylindrical ozone generator (41), featuring phase (42) and zero (43) electrodes with a triangular cross-section, square air ducts (44) and hexagonal supporting rods (45).

Figure 5:
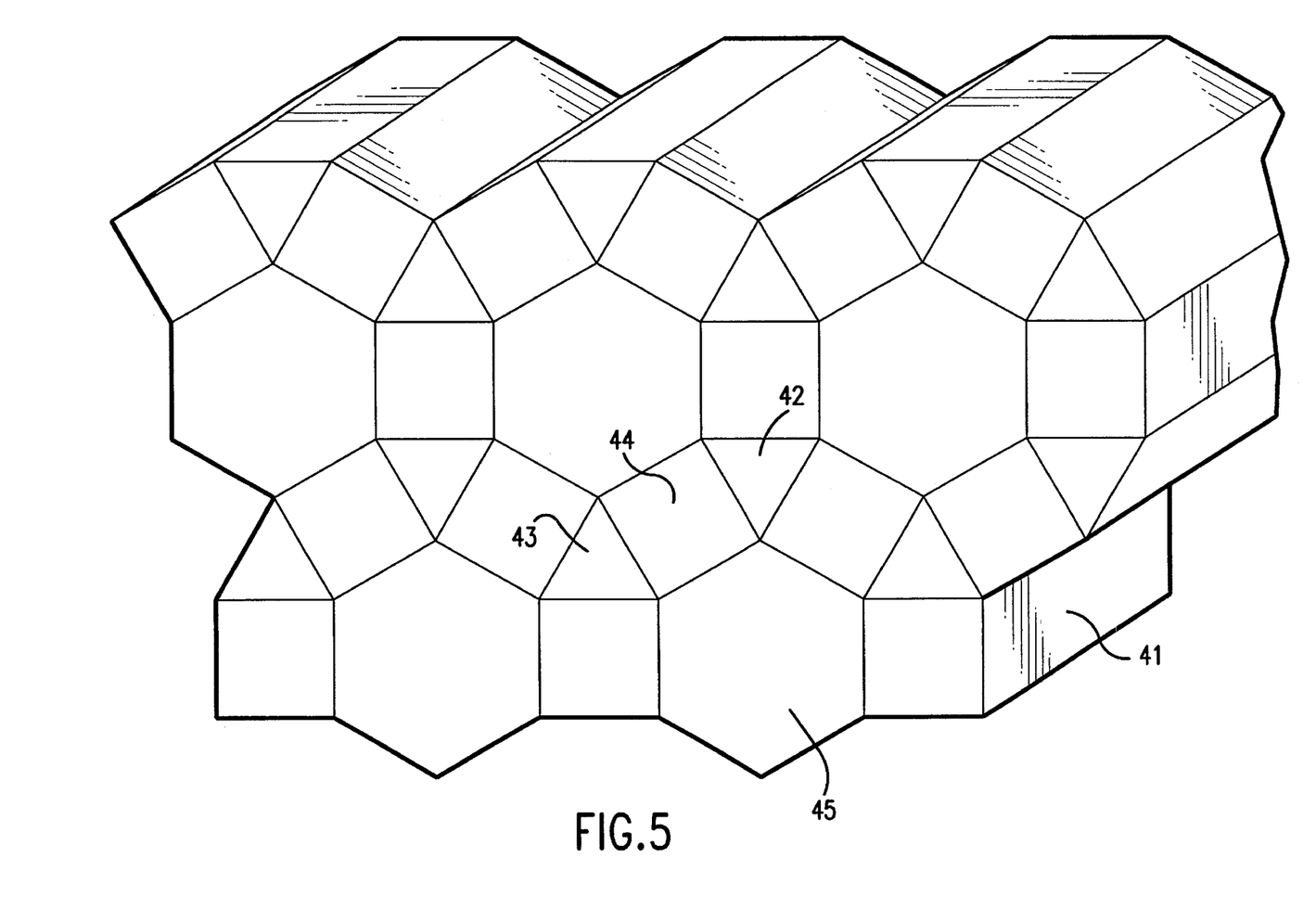
FIG. 5, illustrates a partial assembly of several units as described in FIG. 4.

FIG. 5, shows a partial assembly of several units as described in FIG. 4, the whole assembly being packed in a metal pipe. The advantage of this assembly is the small size of the ozone generator obtained.

Figure 6:
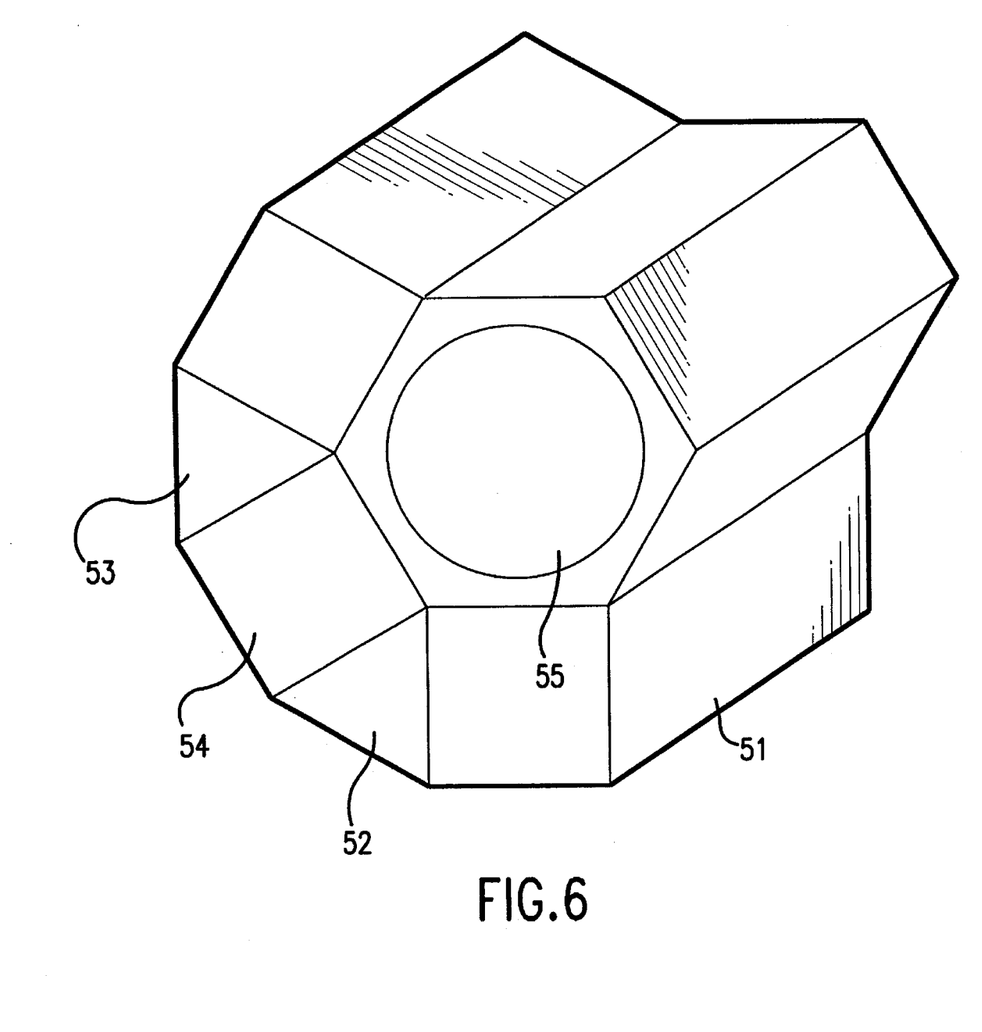
FIG. 6, is similar to FIG. 5, comprising a tunnel which conveys a cooling liquid.

FIG. 6, is similar to FIG. 5, Elements 51, 52, 53, 54, & 55 correspond to elements 41, 42, 43, 44, & 45 respectively except that element (55) signifies a tunnel conveying a cooling liquid.

Figure 7:
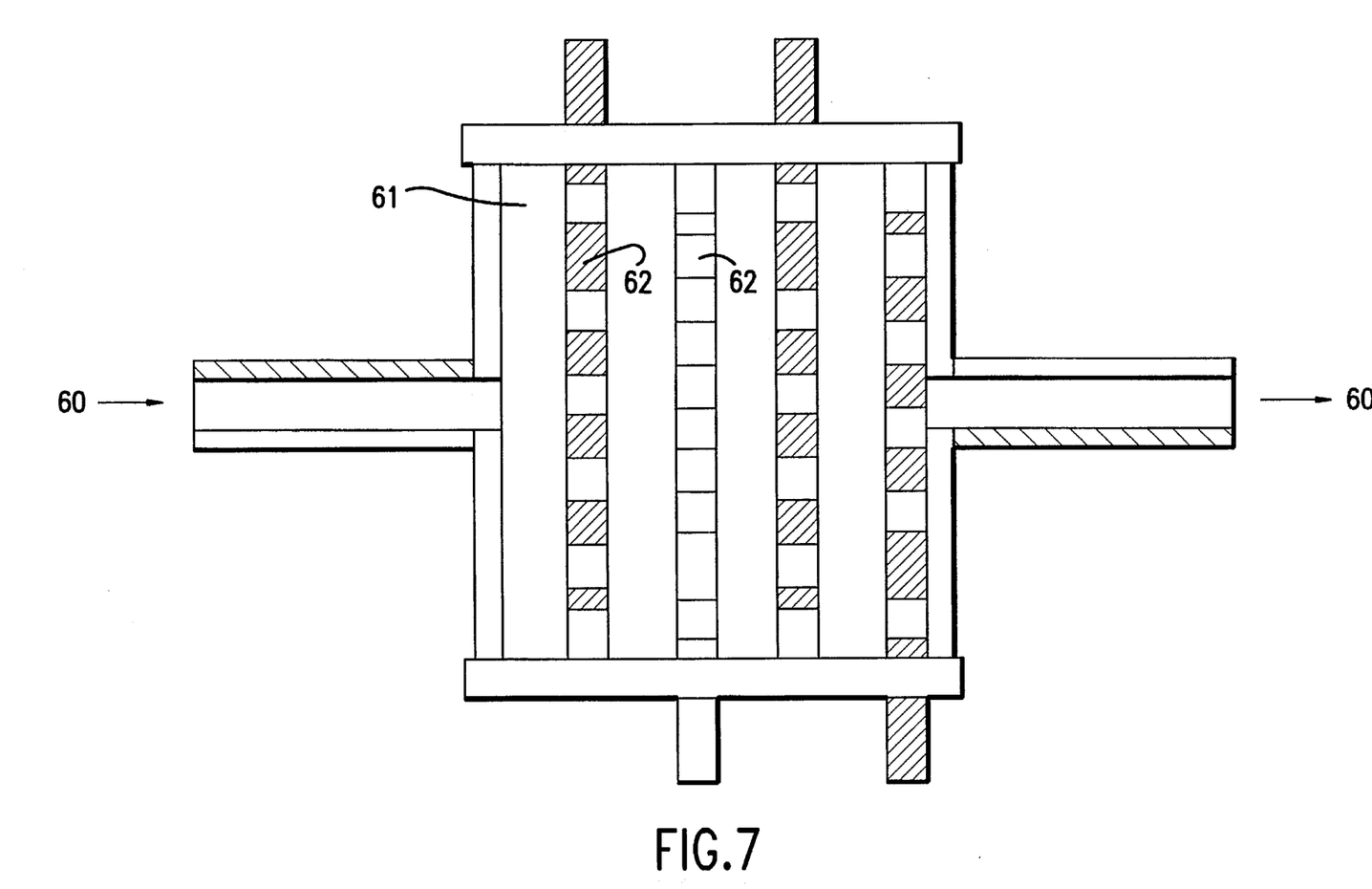
FIG. 7, illustrates an embodiment of the system comprising porous components.

FIG. 7, illustrates an embodiment of the system comprising porous components. The advantage of this generator is that due to the porosity of the porosive insulator (61), the electrodes (62) may be very thin. Also, the cooling will be more efficient as air passage (60) is effected by being conveyed through multiple pores.

Figure 8A:
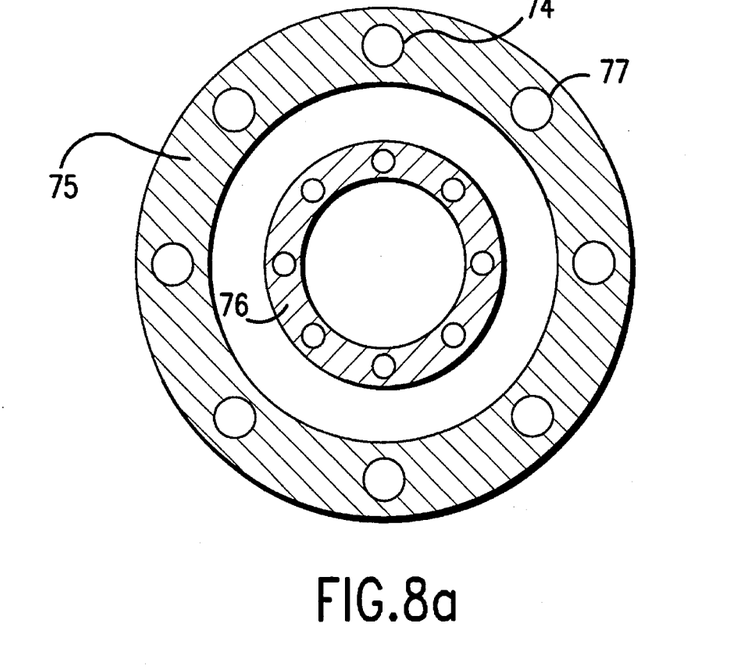
FIGS. 8A–B, illustrate an embodiment wherein a voltage DC multiplier is utilized in the ozone generator.
Figure 8B:
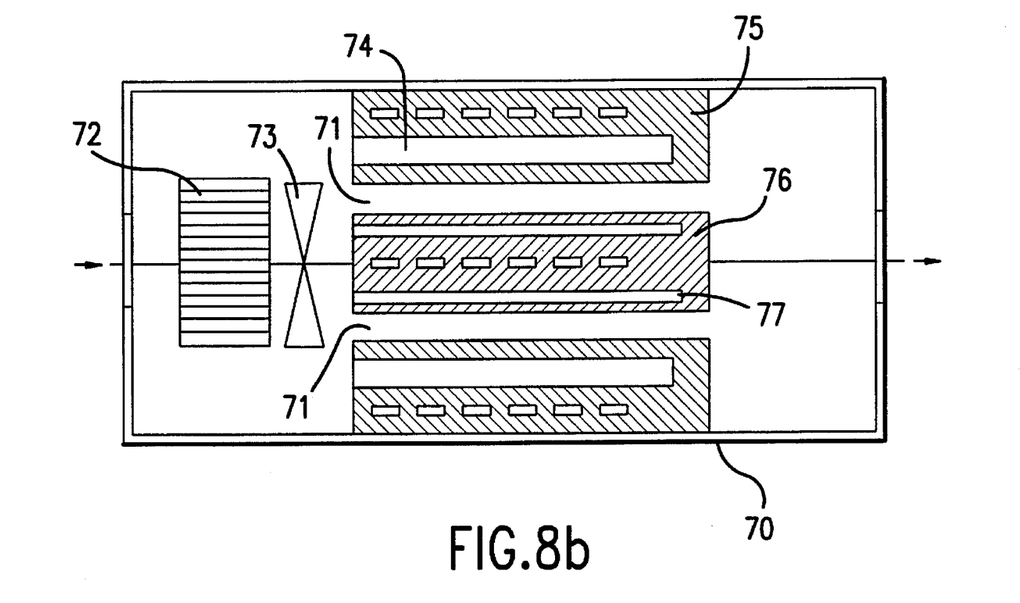

FIGS. 8A–B, illustrate a preferred embodiment wherein a voltage DC multiplier (70) is utilized in the ozone generator. By using a mechanical motion device (72) on or polarity switching between the DC position (74) and DC negative (77) electrodes, an electric AC field will be produced in the gap (71). The advantage of this generator is that a voltage DC multiplier (70) will replace the ordinary high voltage transformer. Accordingly, the ozone will be manufactured from air or oxygen advanced by blower (73) within the gap (71) between the external (75) and internal (76) two cylinders or plates which are in motion, causing the AC field. High voltage is attained within the unit, thus greatly increasing the safety of the ozone generator and simplifying the design of the system.

FIG. 9, is a schematic illustration of a system using the present invention for water purification wherein:

81: a container for receiving the ozone, made of plastic, glass or any other suitable material;
82: the cover of the reservoir;
83: the shelves are located in the reservoir, on which the material to be treated by ozone is loaded;
84: trap at the outlet of the container, for removal of any traces of ozone;
85: the ozone generator;
86: the electrical generator;
87: the filter with the desiccant through which the air or oxygen enters into the generator;
88: a compressor which delivers the air or oxygen into the generator;
89: the electric contacts;
90: a sleeve made of sintered glass which supplies the very small bubbles of ozone;
91: inlet for ozone, and
92: outlet for ozone residues.

FIG. 10, shows the correlation between the intensity of the current and the applied voltage.

FIG. 11, illustrates the extent of ozone production as a function of the current applied, determined from the applied voltage of FIG. 10. Thus 820 mg per hour ozone were produced with a voltage of 4 kV at a rate of 2 $cm^2$.min/l. This is equivalent to a flow rate of 10 liters per minute and an electrode total surface area of 20 $cm^2$.

Figure 12:
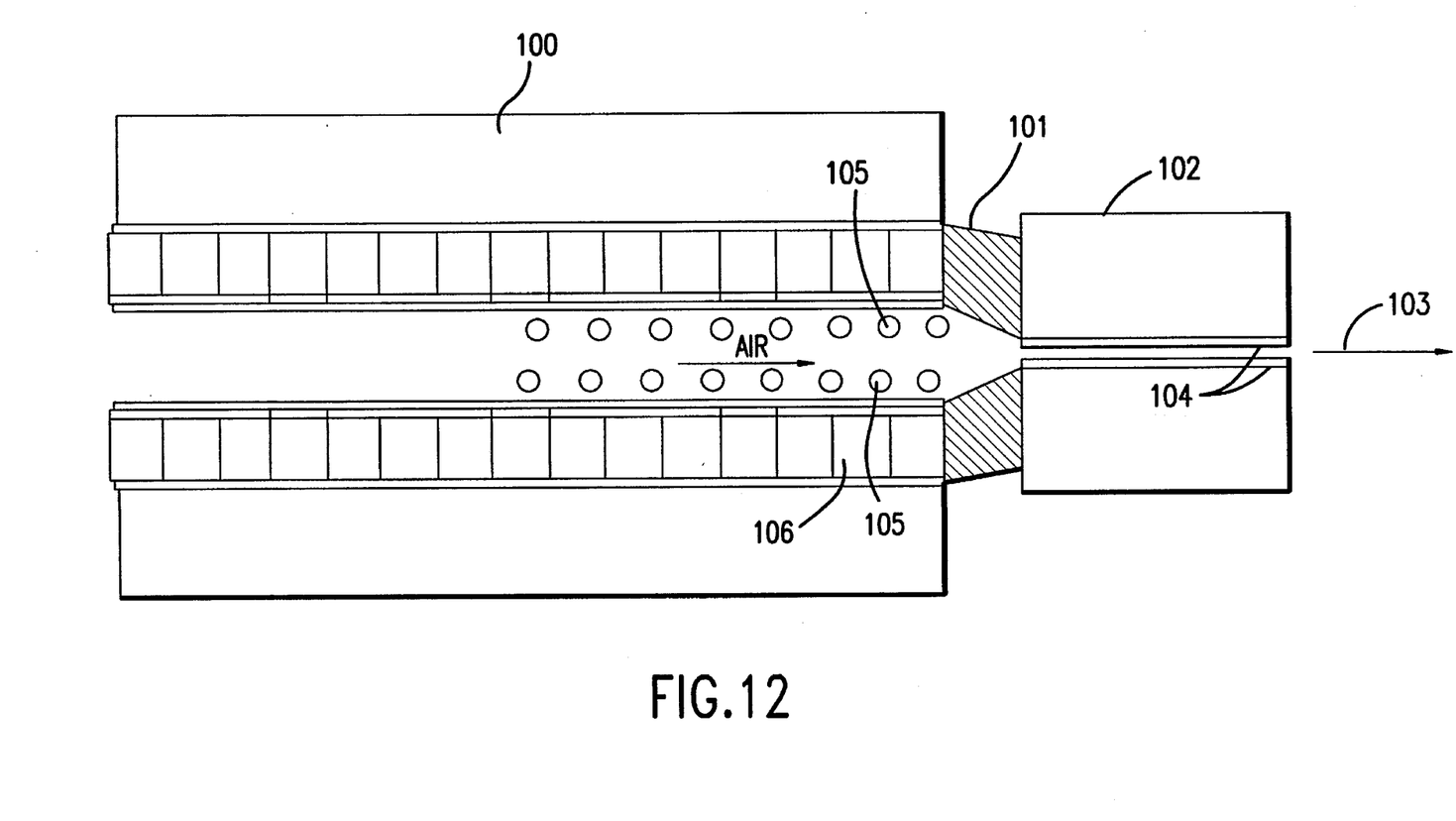
FIG. 12, illustrates schematically another structure of of the generator, with a radiator comprising electronic heat pumps based on Peltier thermoelectric generators.

FIG. 12, illustrates a preferred embodiment, wherein electronic heat-pumps based on thermoelectric generator of the Peltier type are used in a radiator (100) instead of using joint radiators. The radiator (100) is separated from the ozone generator (102) with insulator (101). The advantage obtained by this embodiment is that the Peltier elements 106 facilitate drying of the air by their cooling effect producing condensed water which drains through holes, (105) as shown in the Figure. Both drying and cooling of the air prior to passing between electrodes (104) markedly increase the ozone content of the output (103) of the ozone generator (102).

While the invention has been described in respect to certain preferred embodiments, it should be understood that the description is provided primarily for purposes of illustration, the invention in its broader aspects being covered by the following claims.

We claim:

1. A system for producing ozone at a high efficiency from oxygen or air, having at least two parallel electrodes made of metallic surfaces and separated by dielectric insulating material, wherein air or oxygen is passed through the gaps between the electrodes with an effective electric field of at least 4 kV/mm, comprising:

a) a ratio of electrode surface area to gas volume of at least 2 $cm^2$.min/l, b) the electric field in said gap formed by the difference in potentials between the electrodes and the dielectric insulating material and having a breakdown voltage at least 12 kV/mm; and c. Peltier heat pumps connected to the outer surface of the electrodes and capable of removing heat produced to the outer surface of the electrodes.

2. The ozone system according to claim 1, wherein the frequency of the electric field is at least 50 Hz.

3. The system according to claim 1, wherein dried air or oxygen is passed through the gaps, the drying of said oxygen or air being achieved by a desiccating material.

4. The system according to claim 3, wherein said desiccating material is selected from calcium chloride, magnesium perchlorate, phosphorus pentoxide and silica gel.

5. The system according to claim 1, wherein each of the electrodes in said generator are concentric with a respective dielectric tube, the interaction between the electrodes being external.

6. The system according to claim 1, wherein the ozone generator comprises at least two parallel rectangular plates tubes.

7. The system according to claim 1, wherein the ozone generator is fed by an alternating current from a power source which uses a frequency of up to 20 kHz.

8. The system according to claim 7, wherein said frequency is in the range of 50 Herz to 10 kHz.

9. The system according to claim 1, wherein at least one pair of electrodes is made of a perforated material, featuring at least one hole in each electrode, said electrodes being separated by an insulating porous material.

10. The system according to claim 9, wherein said porous material is selected from sintered alumina, sintered borosilicate and Pyrex glass.

11. The system according to claim 1, wherein at least two electrodes are contained, one having a positive potential and the other having a negative potential, in an internal electrically-insulated cylinder, and at least two electrodes—the one with positive potential and the other with negative potential—packed within an external cylinder, said electrodes capable of switching polarity to produce an electric AC field in the gap between the two cylinders.

12. The system according to claim 1, wherein the ozone released from said system is mixed in a mixing compartment.

13. The system according to claim 12, wherein said mixing compartment is provided with a temperature controller to permit condensation of vapour.

14. The system according to claim 6, wherein at least one of said rectangular plates tubes is in a parallel linear motion.

* * * * *